United States Patent

[11] 3,587,876

| [72] | Inventors | Billy J. Dahlem<br>Golden, Colo.<br>John A. Martin, Denver, Colo. |
|---|---|---|
| [21] | Appl. No. | 778,591 |
| [22] | Filed | Nov. 25, 1968 |
| [45] | Patented | June 28, 1971 |
| [73] | Assignee | Power-Curve Conveyor Company<br>Denver, Colo. |

[54] PALLET-LOADING APPARATUS
16 Claims, 16 Drawing Figs.

[52] U.S. Cl. .................................................. 214/6,
198/31, 198/33
[51] Int. Cl. ............................................... B65g 57/22
[50] Field of Search ............................................ 214/6 (P), 6
(M), 6 (H), 6 (K), 6 (G); 198/31, 33 (A)2, 31
(A)2

[56] References Cited
UNITED STATES PATENTS

| 2,528,860 | 11/1950 | Clark | 198/33(.2) |
|---|---|---|---|
| 2,769,558 | 11/1956 | Ehlers | 214/6(H) |
| 2,883,074 | 4/1959 | Boehl et al. | 214/6(P) |
| 3,027,020 | 3/1962 | McCoy | 214/6(P) |
| 3,085,696 | 4/1963 | Stainforth et al. | 214/6(P) |
| 3,164,080 | 1/1965 | Miller, Jr. | 214/6(P)X |
| 3,245,557 | 4/1966 | Maramonte et al. | 214/6(P) |
| 3,263,827 | 8/1966 | Verrinder | 214/6(P) |
| 3,429,469 | 2/1969 | Peterson | 214/6(K)X |
| 3,442,400 | 5/1969 | Roth et al. | 214/6(P) |

*Primary Examiner*—Gerald M. Forlenza
*Assistant Examiner*—Robert J. Spar
*Attorney*—Sheridan and Ross

ABSTRACT: Pallet loader characterized by a feed conveyor for continuously moving articles in axially spaced relation along a single path to a diverter station where they are thence conveyed along two parallel paths to a continuously moving article orientation station in the form of a roller flight conveyor on which desired articles are selectively rotated 90°, the articles then being delivered to an accumulator station where a desired layer pattern is assembled, the layer pattern then being delivered to a loading station where it is compacted to uniform dimensions and thence delivered to a pallet elevator on which the layer patterns are successively stacked to desired height.

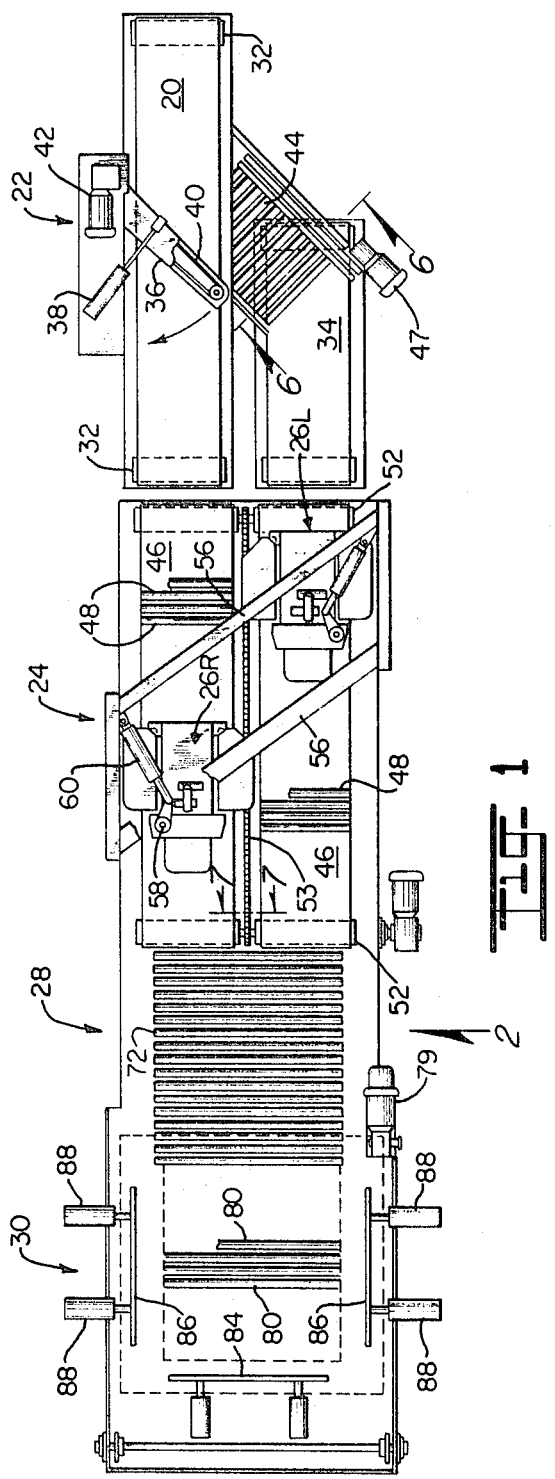

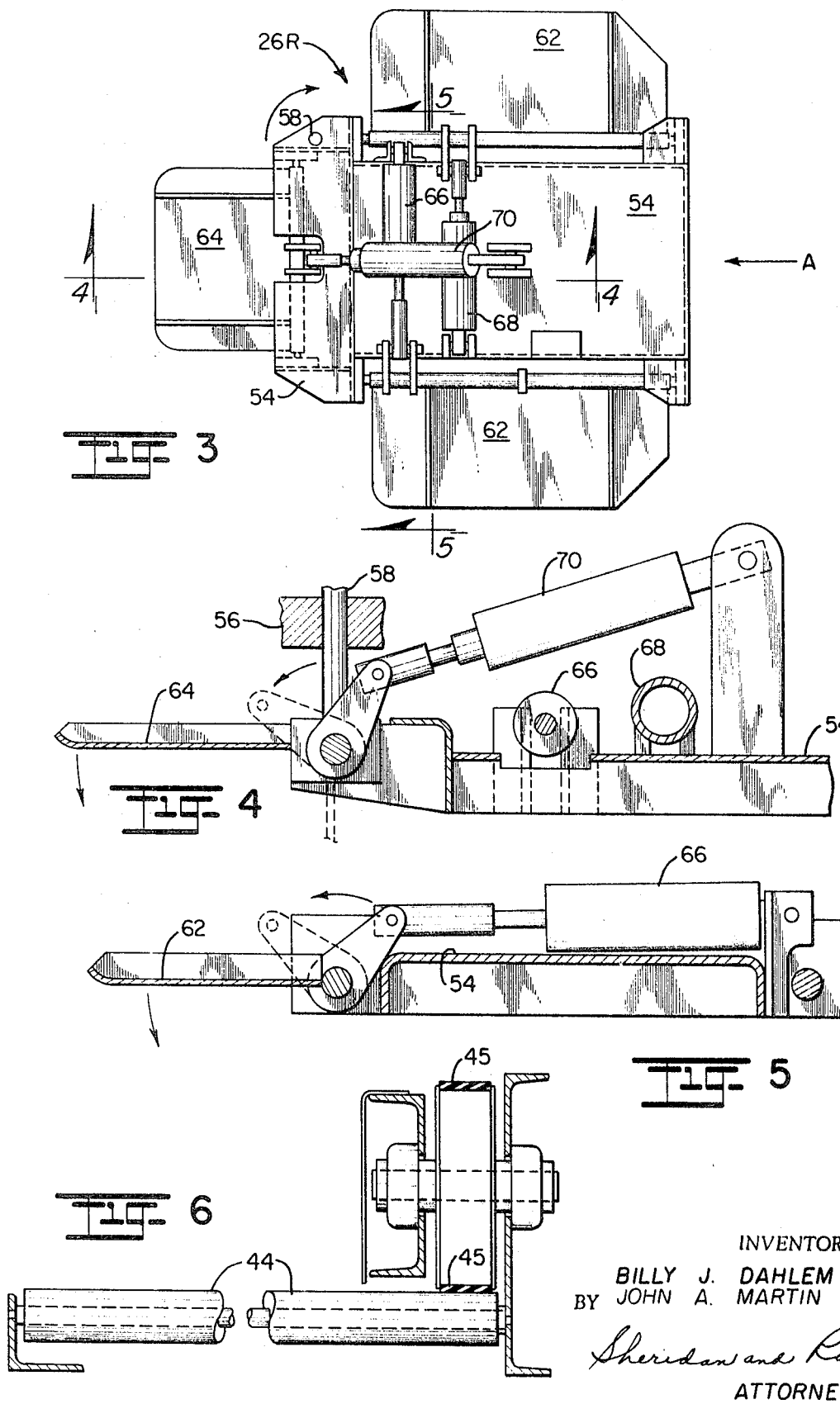

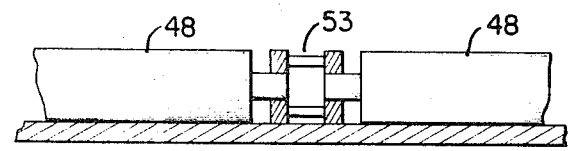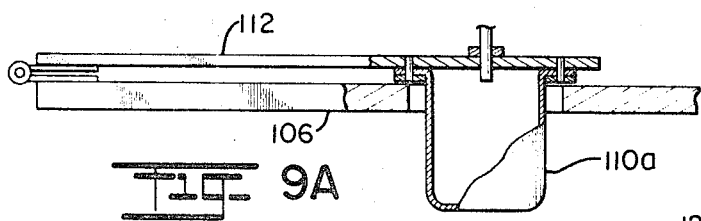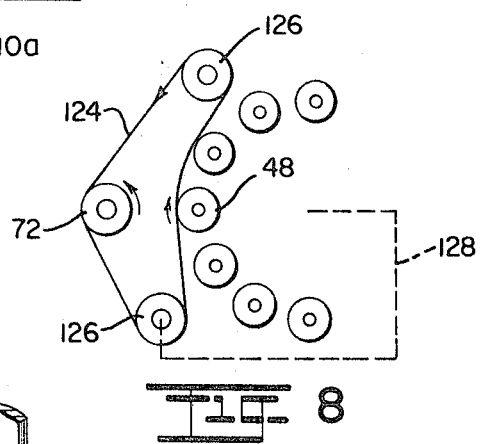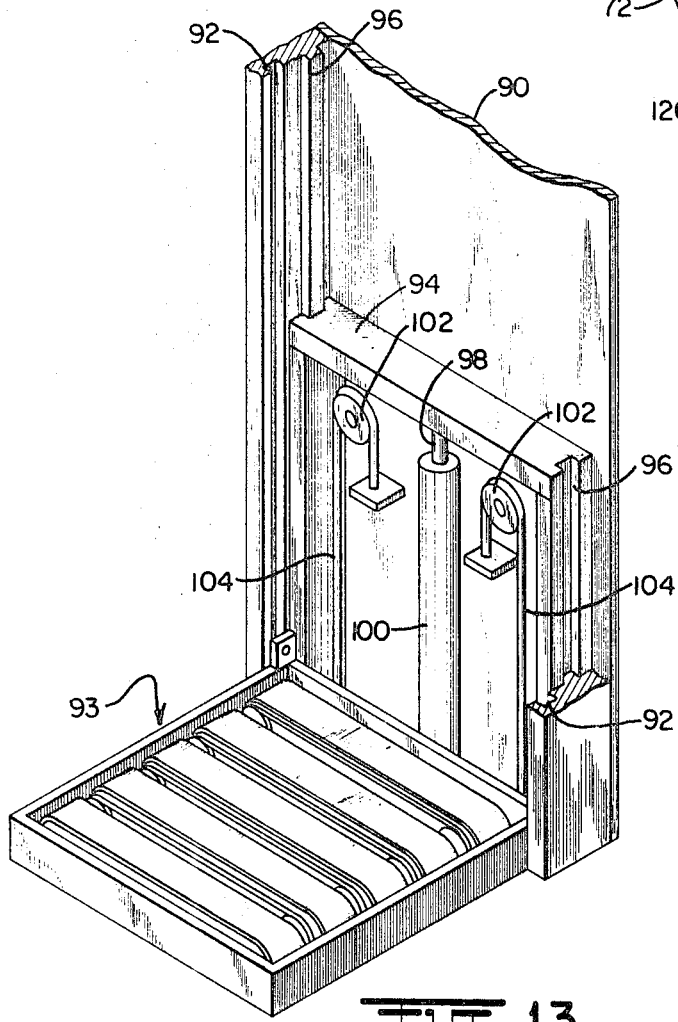

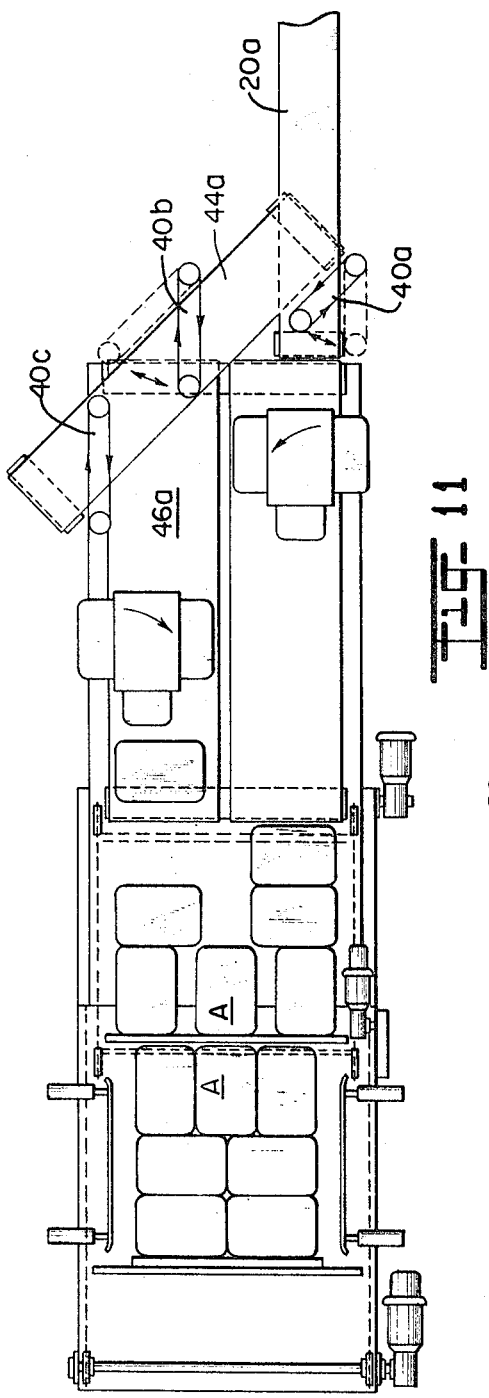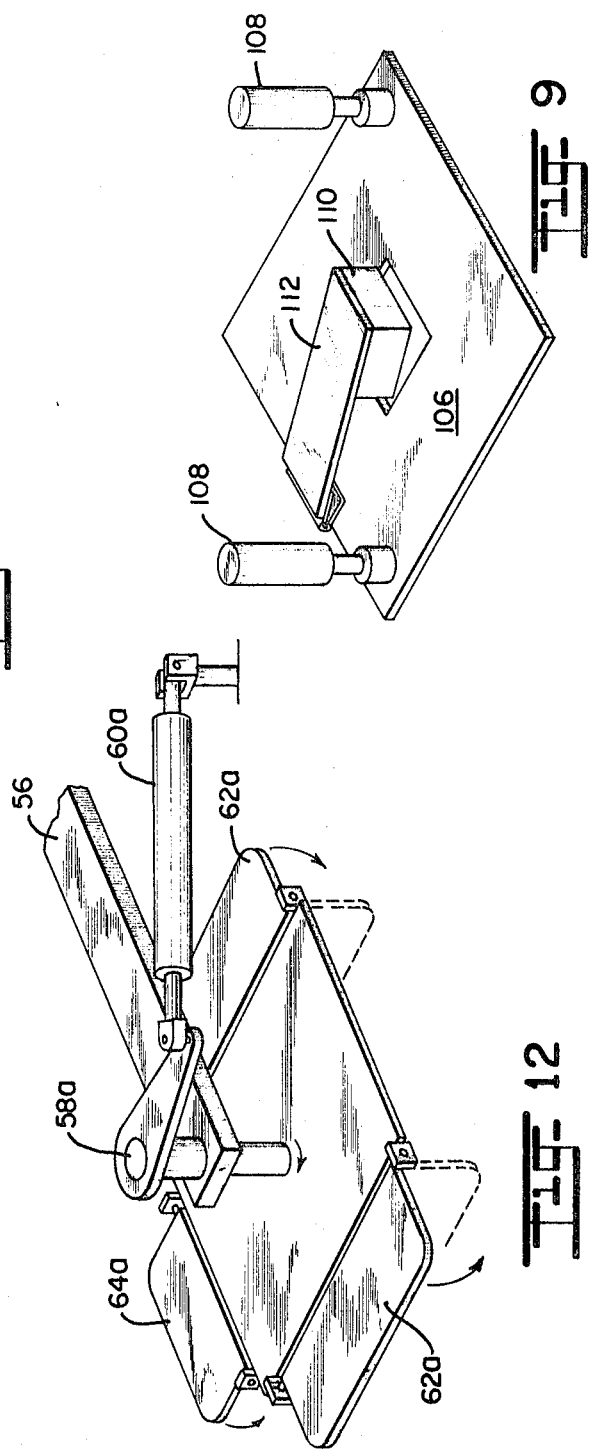

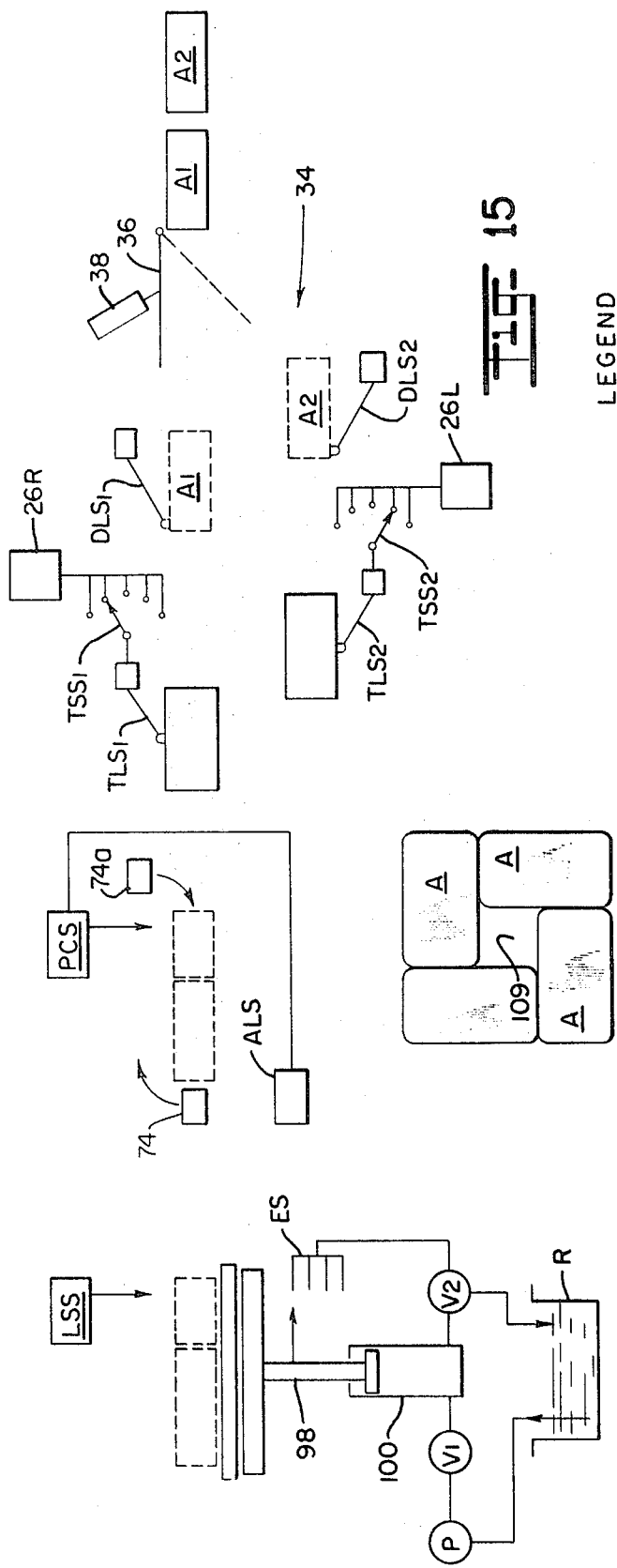

3,587,876

PALLET-LOADING APPARATUS

SUMMARY OF THE INVENTION

Principal features of the invention include: article-rotating devices disposed above the orientation station which confine, rotate and release an article, during which time the flight rollers rotate in contact with same while bodily moving relative thereto; the manner of conveying an article to a position in which its longitudinal axis is aligned with the longitudinal axis of the roller flight conveyor and accumulator station, whereby the longitudinal axes of an odd number of articles, such as three, may be disposed in parallel relation; transposing the positions of a pattern stop and pusher at the accumulator station upon completion of assembly of a pattern thereat; compacting a pattern at the loading station to uniform thickness to thereby effect uniform vertical stacking on a pallet carried by the elevator and alternatively with certain patterns providing a central stop member about which the articles may be compacted; an optional form of movable support or floor at the accumulator and/or the loading stations which support the articles on a blanket of air thus reducing friction during relative movement; a cantilevered elevator or pallet support platform operated by a relatively short stroke hydraulic ram, minimizing spacial requirements and obviating floor excavation; and other features which will become apparent from the subsequent detailed description.

BRIEF DESCRIPTION OF THE DRAWINGS

FIG. 1 is a schematic top elevation of the subject of the invention, portions being broken away;

FIG. 2 is a schematic side elevation, as viewed in the direction of arrow 2, FIG. 1, certain portions shown in FIG. 1 being omitted;

FIG. 3 is a top plan of a detail, as viewed in the direction of arrow 3, FIG. 2;

FIG. 4 is a section taken on line 4—4, FIG. 3;

FIG. 5 is a section taken on line 5—5, FIG. 3;

FIG. 6 is a section taken on line 6—6, FIG. 1;

FIG. 7 is a section taken on line 7—7, FIG. 1;

FIG. 8 is a detail in the locus of arrow 8, FIG. 2;

FIG. 9 is an isometric view of an optional accessory;

FIG. 9a is an alternative form of plug which may be employed in FIG. 9;

FIG. 10 is a side elevation and section through an alternative form of platen;

FIG. 11 is a top plan like FIG. 1 illustrating an optional type of diverter;

FIG. 12 is an isometric view of an optional type of article-turning device;

FIG. 13 is an isometric view of the pallet elevator;

FIG. 14 illustrates the arrangement of a four-article pattern, and

FIG. 15 is a schematic of an exemplary control system.

GENERAL DESCRIPTION OF THE PREFERRED EMBODIMENT

Referring now to the drawing, and first to FIGS. 1 and 2, the principal components of the invention, as hereinbefore referred to, comprise: a feed conveyor 20 forming a part of a diverter station 22, an endless conveyor and orientation station 24, including a pair of article turning devices 26R, 26L; an accumulator station 28; and a loading station 30 each of which will now be described in detail.

FEED CONVEYOR AND DIVERTER STATION

Feed conveyor 20 is of the conventional endless belt type, trained about suitable rolls 32 one or more of which may be power driven by a suitable motor (not shown). A similar power-driven endless belt conveyor 34 is disposed adjacent and parallel to conveyor 20. A plowoff arm 36 is pivotally connected to any suitably fixed structure for movement from the full line position shown, where it is disposed angularly in the path of an article supported by conveyor 20, to a position out of such path, the arm being movable upon command by a double-acting piston-type air actuator 38. Arm 36 supports an endless belt 40, driven in any suitable manner by an electric motor 42, preferably of the speed-reducing type. A plurality of parallel rolls 44, driven in synchronism by endless belt 45 (FIG. 6) connected to a motor 47, are disposed in angular relation to conveyors 20, 34. In the operation of this component, an article supported by conveyor 20 will continue to move therealong to its left end when the plowoff is in one position but when moved to the full line position it will engage belt 40 and be diverted onto rolls 44, diverting it onto conveyor 34 on which it will again move with its longitudinal axis parallel to its original path.

ORIENTATION STATION

Orientation station 24 comprises a pair of adjacent endless conveyors 46, 46 each in the form of idler rolls 48, supported at their ends by the links of side chains 50 trained over sprockets 52 and a central chain 53 (FIGS. 1 and 7), the sprockets being power driven in unison in any suitable manner. While conveyors 46, 46 are connected together and their upper article-supporting surfaces or roller flights bodily move at the same velocity, the rollers of each flight may rotate independently and for a purpose which will subsequently appear.

Turning devices 26R, 26L (FIGS. 3, 4 and 5), each comprise a generally rectangular frame 54 pivotally connected to overhead rigid structure 56 by a vertical pivot pin 58, this being disposed near one corner of the frame. A double-acting piston-type air actuator 60 is pivotally connected at its ends to the pivoted frame and the rigid structure and serves to swing a turning device 26R or 26L 90° clockwise and counterclockwise, respectively, as viewed in FIG. 1. A pair of downwardly movable hinged flaps 62, 62 are disposed adjacent opposite edges of frame 54 and a third like flap 64 is disposed along a third edge, these being movable 90° about their horizontal pivotal axes by double-acting air actuators 66, 68, 70.

In the operation of a turning device it will first be assumed that an article A (FIG. 3) is bodily moving with a roller flight with its longitudinal axis aligned with the direction of movement and it is desired to continue such movement. In this event no command is given to the turning device and the article bypasses beneath it without change of orientation. If, however, it is desired to rotate an article 90° on its roller flight, a command is given to lower the flaps and rotate the turning device 90° about its pivotal axis after which another command is given to raise the flaps and return the turning device to its original position. During this operation, downstream flap 64 blocks translation of the article, and flaps 62, 62 confine it, so that it may be rotated 90° as the turning device rotates. Since the article is no longer bodily moving with the roller flight during this orientation, the idler rolls rotate in contact with the bottom surface of the article as they bodily move across same thus minimizing friction and any tendency to tear or otherwise damage the article in distinction to a conventional flat conveyor belt which is devoid of such rolling contact.

ACCUMULATOR STATION

When the flaps, just described, have been raised an article resumes its movement with the roller flight and is delivered from its downstream end onto the accumulator station 28, the bed of which is formed of parallel adjacent fixed axes idler rolls 72, preferably disposed in a slightly downwardly inclined plane. The first article coasts down the incline and is arrested by a crossbar or idler roll 74, the ends of which are secured to chains 76 trained about pairs of sprockets 78, 78 at each side of the accumulator station. Subsequent articles are then delivered behind the first ones until the desired pattern is formed at the accumulator station. When this occurs, command is given to move bar 74 by motor 79 in a clockwise direction as viewed in FIG. 2. Bar 74 thus moves away from arresting position and another like pusher bar 74a engages the rear surface of the pattern, transporting the entire pattern onto the loading station, bar 74a stopping when it reaches the former position of bar 74, thus being in a position to arrest the next pattern to be formed at the accumulator station.

LOADING STATION

The loading station, onto which the pattern is transferred from the accumulator station, comprises a plurality of parallel adjacent link connected idler rolls 80, the ends of which may move under power in suitable guideways adjacent each side of the loading station. In effect, this forms a curtain, the floor of which may be moved from under the articles and allow them to drop onto a pallet disposed below the curtain floor or onto a previous pattern already disposed on the pallet. The terminal end of the loading station is provided with an adjustable stop plate 84 for adjusting the position of the pattern at the loading station and for restraining the pattern when the idler rolls are withdrawn. Also, a pair of compacting plates 86, 86 operated by air actuators 88 is provided adjacent the side edges of the loading station for squeezing the pattern toward the longitudinal axis of the loading station.

ELEVATOR

One side edge of the loading station is supported from a floor or the like by a frame 90, best shown in FIG. 13, which is provided with a pair of spaced guideways 92, 92 which support a cantilevered pallet platform 93 for vertical rectilinear movement. The ends of a crosshead 94 are similarly guided by guideways 96, 96, a piston rod 98 of a hydraulic actuator 100 being rigidly affixed to the crosshead. The crosshead rotatably carries a pair of idler pulleys 102, 102 around which are trained chains 104, 104 one end of each chain being affixed to the frame and the other end to the pallet platform. With this construction, the stroke of the ram doubles the vertical movement of the platform and permits reduced spacial requirements of the ram, as compared to a direct-coupled hydraulic ram system, allowing the ram to be disposed above floor level and obviating floor excavation for the loader, all of which is disposed above the floor.

ALTERNATIVE FORMS OF THE INVENTION

It is important for economic reasons to render a pallet loader of the type so far described as versatile as possible so that it may load various patterns on a pallet which may vary, say, between four and seven or more articles to each layer pattern and with a minimum substitution of components or the addition of an accessory to the basic components. As so far described, any pattern may be formed by any combination of articles moving along parallel paths and turned 90°. In some instances, however, it is desired to move an article transversely of these two paths. FIG. 11 illustrates a form of diverter for attaining this end, the remaining components of the loader being unchanged. In this construction a first pivoted plowoff belt 40a, like belt 40 previously described, is provided adjacent feed conveyor 20a which diverts an article onto roller flight conveyor 44a. A second pivoted plowoff belt 40b is provided adjacent conveyor 44a and a third fixed plowoff belt or diverter 40c is provided at the intersection of conveyor 44a and conveyor 44a. Plowoff 40a operates in the same manner as plowoff 40, however, plowoff 40b, not present in the previously described construction, serves the purpose of diverting an article along the central axis of the orientation and accumulator stations. This article, of course, will not be turned by the turning devices since it is in a position intermediate same.

In an alternative form (not shown) the construction of FIGS. 1 and 2 may be modified by incorporating one or a pair of opposed lateral pushers adjacent the orientation station which will move an article laterally of its normal path to a position aligned with the central axis of the orientation station. Thus, with the substitution of the plowoff construction just described or with the addition of one or more lateral pushers to the basic apparatus previously described an article may be disposed at a central position of the orientation station without major alterations of the basic components of the apparatus. FIG. 11 also illustrates a seven-article pattern in which articles A have been conveyed to the central position, by diverting same with plowoff 40b or with a lateral pusher as just described, the remaining articles being delivered to the positions shown in the normal manner as described in connection with the basic apparatus.

LOADING STATION VERTICAL COMPACTOR

In some instances it is desirable to vertically compact a pattern, particularly if the articles are sacked material, at the loading station before delivery to the elevator in order that each pattern layer will be of uniform thickness and flatness and thus produce more uniform and stable stacking and improved crosstying. To attain this end, a compactor plate 106, as shown in FIG. 9, may be disposed above the loading station, suitably guided for vertical rectilinear movement and operated by air actuators 108, 108. As will be understood, after the pattern is delivered to the loading station and laterally compacted, the plate will then descent onto the top of the pattern, squeezing the articles until the upper and lower planes of same are parallel and uniformly flat.

In certain patterns, such as a four-bag pattern, as shown in FIG. 14, the articles A, such as loaded bags, are arranged with a void 109 at their geometric center. To provide for more uniform compaction in such arrangement, plate 106 may be provided with a plug 110, carried by a hinged arm 112 which may be operated in any suitable manner, such as by an air actuator (not shown). In this construction, the plug may be lowered into the void and the articles compacted laterally about same. Vertical compaction may, of course, also be optionally employed.

The plug may be of any desired fixed cross-sectional shape, however, to avoid replacement of the plug to accommodate different cross-sectional dimensions of the void, a plug 110a (FIG. 9a) may be affixed to arm 112, this being in the form of an inflatable and expansible bag, the cross-sectional shape of which may be varied by variable internal fluid pressure.

ACCUMULATOR AND LOADING STATION PLATENS

FIG. 10 illustrates an alternative form of loading station floor or platen in the form of a hollow plate 114, suitably braced internally, and provided with apertures 116 in its upper surface. Air under pressure is delivered to the space within the platen which exhausts through the apertures, producing an air blanket between the upper surface of the plate and the bottom surfaces of the articles, thus minimizing sliding friction as the plate is translated away from the articles. The plate may be translated in any desired manner illustrative of which are racks 118 affixed to opposite edges of the plate and movable by a rotatable cross-shaft 120 to which is affixed a pair of pinions 122 each engageable with a rack.

The accumulator station may be constructed in identical manner but since it remains stationary, the racks and pinions are not required.

TURNING DEVICE

FIG. 12 illustrates an alternative form of turning device which differs from the one previously described in that its pivot 58a is disposed at the geometrical center of the frame, rather than adjacent one corner, the frame being rotatable 90° by an actuator 60a. Flaps 62a, 62a and 64a are hinged in the same manner previously described and operated by like actuators which have been omitted in the interest of simplification of the drawing. This may be disposed above the orientation station in the same manner previously described for the corner-pivoted turning device and is of improved utility for certain shapes of articles, particularly those of relatively longer length than customary sacks, for example, long boxes or an assembly of small boxes which are to be turned about an axis intermediate their ends, rather than about an axis near one corner of same.

ORIENTATION STATION TO ACCUMULATOR STATION TRANSFER

In the transfer of certain shaped bags of material from the left end (FIG. 2) of the orientation station to the accumulator station, there may be a tendency for an edge of the bag to enter the nip formed by the first idler roll on the accumulator and an idler roll of the roller flight conveyor thus tending to damage a bag. FIG. 8 illustrates an optional feature of the invention to obviate this tendency wherein a belt 124 is trained above the first roll 72 of the accumulator and rolls 126, 126, the concave flight of which is engaged by rolls 48 of the roller flight conveyor as they move in contact with the belt. The belt is power driven in any suitable manner, such as by a power takeoff 128 from the roller flight conveyor so that rolls 72, 48 are rotated in the direction of the arrows which as will be apparent provides a roller nip which rejects entry of a sack into same. As soon as it has passed this point and engaged the second roll 72 on the accumulator, the tendency to enter the nips of the accumulator rolls no longer exists and the sack smoothly rolls to its intended position on the accumulator station.

CONTROLS AND OPERATION

Referring to FIG. 15, and first assuming that diverter arm 36 is in the solid-line position, an article $A_1$ will continue in its same path until it engages a diverter limit switch $DLS_1$, whereupon a command signal operates a suitable solenoid air valve communicating with actuator 38, moving arm 36 to the dotted position. The succeeding article $A_2$ will then be diverted to parallel conveyor 34 and similarly engage a like limit switch $DLS_2$ which will return the arm to its full-line position. As will be apparent one set of alternate articles $A_1$, $A_1$ etc. continue in a straight path and the other set of alternate articles $A_2$, $A_2$ etc. are diverted to a parallel spaced path on conveyor 34.

Assuming now that an article $A_1$ is on the right flight, it will engage a turning limit switch $TLS_1$ which signals turning stepping switch $TSS_1$ to step. The stepped position may either call for bypassing the article, without operation of the right turning device 26R or for it to operate in which event the flaps are lowered and the turning device is rotated 90°. Preferably, the article will be held in such position until a second article $A_2$ is in like position on the left flight, whereupon the flaps will raise, releasing article $A_1$, and return to its original position. A similar turning limit switch $TLS_2$, and turning stepping switch $TSS_2$ are provided which similarly cycle the operation of left-turning device 26L. As will be apparent, by suitable construction of the two stepping switches two succeeding articles $A_1$, $A_2$ may both bypass their respective turning devices, both may be turned, or either one turned and the other bypassed.

The articles continue to be conveyed in like manner until the desired pattern has been assembled at the accumulator station whereupon a pattern completion sensing switch PCS signals motor 79 to move the pattern stop 74 to the position of pusher 74a, the latter meanwhile pushing the entire pattern onto the loading station. When this occurs an accumulator limit switch ALS signals for cessation of movement of pusher 74a, which now becomes a pattern stop 74 for the assembly of the next pattern layer at the accumulator station.

When the pattern has been transferred from the accumulator station to the loading station, a loading station sensing switch LSS senses this and cycles the lateral compactor plates 86, 86. Either during this operation or subsequent thereto the vertical compactor is also cycled, if such be employed. The completion of compaction then signals the loading station floor or platen to move from beneath the pattern and deposit it on the pallet or on a pattern layer previously formed thereon. The completion of deposit of this layer then signals elevator switch ES to open exhaust valve $V_2$ to permit discharge of a predetermined quantity of liquid from the elevator actuator and permit the elevator to drop by gravity a predetermined increment equal to the thickness of a pattern layer and upon completion of this operation the loader floor is signaled to return to its original closed position, thus completing the cycle for one pattern layer on the pallet.

The operation for one cycle, as just described, continues until the desired number of layers are stacked on the pallet, whereupon the elevator lowers to its lower limit, the loaded pallet is conveyed from the elevator and an empty pallet delivered thereto from a pallet supply, the elevator thence being raised to its uppermost position. Since automatic pallet transport from the elevator and pallet replacement thereto is generally conventional in the art, these components have not been illustrated in the interests of simplification of the drawing. It is to be understood, however, that such apparatus may be employed with the invention in its most refined form. It may, however, be omitted where cost or loading rate does not warrant it and a forklift may be employed to remove a loaded pallet from the elevator and replenish same with an empty pallet. A forklift or the like, or the automatic apparatus, thus both constitute means for removing a loaded pallet from the elevator and replenishing same with an empty pallet.

It is to be understood that this invention is not limited to the exact embodiments of the methods and apparatuses shown and described, which are merely by way of illustration and not limitation, as various other forms and modifications will be apparent to those skilled in the art, and it is therefore intended that the appended claims cover all such changes and modifications.

We claim:

1. Apparatus for loading a plurality of generally rectangular and identical articles, such as material containers and contents, onto a pallet in a plurality of stacked crosstied layers thereon, all articles having like reference axes with respect to their general symmetry, comprising:
    a. a power-driven feed conveyor for transporting all of said articles in a path therealong and in axial spaced relation with their reference axes in general alignment,
    b. article-diverting means for transporting a portion of said articles to a position for movement along a path parallel to that of said feed conveyor,
    c. a pair of adjacent synchronously and continuously power-driven endless turning station conveyors each having an upper run for receiving and transporting along parallel paths, the articles delivered from said feed conveyor and diverting means,
    d. article-rotating means disposed above each of said turning station conveyors for selectively arresting the transportation of the articles by engaging the forward end and adjacent sides of an article thereon in order to rotate the article about its reference axis substantially 90°, in a plane parallel to the upper run of each of said turning station conveyors and during continued movement of said runs,
    e. a layer accumulator station for receiving a set of said articles, said set constituting a desired pattern for one of said layers,
    f. means for periodically transporting each set, after formation of same, to a loading station,
    g. a vertically movable pallet-carrying elevator disposed below said loading station,
    h. means for effecting transfer of a pattern at the loading station to the pallet, and
    i. means for periodically lowering the elevator a predetermined distance for permitting transfer of a succeeding pattern to the top of a preceeding pattern.

2. Apparatus in accordance with claim 1 wherein each article-rotating means comprises a member pivoted about a vertical axis, power means for rotating the member between opposite limits of rotation, and power operated movable means carried by the member for releasably engaging the forward end and adjacent sides of an article.

3. Apparatus in accordance with claim 2 wherein said member is pivoted relative to an article to rotate it substantially about one corner of same.

4. Apparatus in accordance with claim 2 wherein said member is pivoted relative to an article to rotate it about an axis intermediate its ends.

5. Apparatus in accordance with claim 1 wherein each turning station conveyor is provided with adjacent parallel idler rolls upon which the article rests, adapted to roll in contact with same during the period when the article is being rotated and arrested from translation therewith.

6. Apparatus in accordance with claim 1 wherein said article-diverting means comprises a frame member pivoted about a substantially vertical axis, power means for swinging said frame member from a position out of the path of an article carried by said power-driven feed conveyor to a position in the path of same, a power-operated endless belt diverter carried by said frame member having a run for engaging a side of the article and conveying same angularly from its original path on said feed conveyor, and a power-operated diverter conveyor for engaging the bottom of the article for continuing its diversion to a position for return to a path parallel with its original path.

7. Apparatus in accordance with claim 1 wherein said accumulator station comprises a platform, a first member disposed across and above the exit end of the platform for preventing movement of articles therefrom, a second member disposed adjacent the entrance end of the platform in a position to permit movement of articles thereto, and power-operated means for periodically transposing the positions of said members whereby the first member permits movement of the articles to the loading station and the second member engages and transports same thereto during the period of transposition.

8. Apparatus in accordance with claim 1 including means disposed at the opposite sides of the loading station for engaging the articles thereon and compacting same laterally toward each other.

9. Apparatus in accordance with claim 1 wherein the pallet carrying elevator comprises a frame supported for movement in a vertical plane adjacent one side of said loading station and having laterally extending cantilevered pallet-engaging surfaces, a vertically extending hydraulic ram for lifting said frame from its lowermost position to its uppermost position, said ram having a stroke less than the distance of travel between the positions aforesaid, and motion-multiplying mechanism connecting the ram to the frame, whereby the frame may be moved a distance greater than the stroke of the ram, thereby reducing the spacial requirements of the ram as compared with a ram having a stroke equal to said distance of travel.

10. Apparatus in accordance with claim 9 wherein said motion-multiplying means comprises a system including at least one pulley and a tensioned flexible member, such as a chain or cable, adapted to double the stroke of the ram.

11. Apparatus in accordance with claim 1 including a pair of adjacent rollers disposed between the exit ends of the turning station conveyors and the entrance end of the layer accumulator station, and power means for driving same in such opposite directions to reject an article tending to enter the nip therebetween, whereby the article passes across the exit ends of the turning station conveyors and onto the accumulator station without interference.

12. Apparatus in accordance with claim 2 wherein the movable means carried by the pivoted member comprises at least three pivoted flaps, two of which are disposed along opposite sides of a rectangle and a third across an end of the rectangle, and power means for moving said flaps toward and away from the upper run of the turning station conveyors, whereby they may releasably engage three sides of an article, the third flap being on a downstream end to serve as an article stop and arrest its movement along the run until released for continued movement therealong.

13. Apparatus in accordance with claim 1 including a vertically movable pressure plate disposed above the loading station for compressing a pattern thereon to uniform thickness, including a stop member carried by same about which four rectangular articles may be compacted into a pattern of square outline with a square void at their center.

14. Apparatus in accordance with claim 1 wherein at least the layer accumulator or loading station includes a perforate platen and an air supply thereto, supporting the lower surface of the pattern on an air blanket.

15. Apparatus in accordance with claim 1 including means for positioning an article on said turning station conveyors centrally therebetween whereby it may be delivered to the central axis of the accumulator station whereby at least three articles may be disposed thereon with their longitudinal axes in parallel relation.

16. Apparatus in accordance with claim 15 wherein said means for positioning an article includes a power-operated endless belt diverter.